US009688902B2

(12) United States Patent
Kulkarni et al.

(10) Patent No.: US 9,688,902 B2
(45) Date of Patent: Jun. 27, 2017

(54) DRILLING FLUIDS WITH HIGH DISPERSED PHASE CONCENTRATION (71) Applicant: Halliburton Energy Services, Inc., Houston, TX (US)

(72) Inventors: Sandeep D. Kulkarni, Kingwood, TX (US); Dale E. Jamison, Humble, TX (US); Dhanashree Gajanan Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/904,493

(22) PCT Filed: Jun. 1, 2015

(86) PCT No.: PCT/US2015/033472
§ 371 (c)(1),
(2) Date: Jan. 12, 2016

(87) PCT Pub. No.: WO2016/195650
PCT Pub. Date: Dec. 8, 2016

(65) Prior Publication Data
US 2017/0088764 A1 Mar. 30, 2017

(51) Int. Cl.
*E21B 21/06* (2006.01)
*E21B 21/08* (2006.01)
(Continued)

(52) U.S. Cl.
CPC ............... *C09K 8/36* (2013.01); *E21B 21/00* (2013.01); *E21B 21/062* (2013.01); *E21B 21/08* (2013.01)

(58) Field of Classification Search
CPC .......... C09K 8/035; C09K 8/032; C09K 8/32; C09K 2208/18; E21B 21/08; E21B 21/062
See application file for complete search history.

(56) References Cited

U.S. PATENT DOCUMENTS 3,311,553 A 3/1967 Weiss et al.
3,472,768 A 10/1969 Estes et al.
(Continued)

OTHER PUBLICATIONS

Kruif, et al., Hard Sphere Colloidal Dispersion: Viscosity as a Function of Shear Rate and Volume Fraction, J. Chem. Phys. 83, 4717 (1985).
(Continued)

*Primary Examiner* — Zakiya W Bates
(74) *Attorney, Agent, or Firm* — McDermott Will & Emery LLP (57) ABSTRACT Increasing the dispersed phase concentration in drilling fluids may decrease sag in the drilling fluids. The dispersed phase of a drilling fluid may be composed of solids (e.g., weighting agents) and emulsion droplets (for emulsified drilling fluids) dispersed in the continuous phase. For example, an exemplary drilling fluid may include a base fluid and a dispersed phase that includes at least one of: extremely low gravity solids, low gravity solids, high gravity solids, or emulsion droplets; wherein the drilling fluid has a density of about 5 pounds per gallon to about 25 pounds per gallon and has a disperse solids volume fraction greater than or equal to 0.35 and/or has a disperse phase volume fraction greater than or equal to 0.5.

20 Claims, 3 Drawing Sheets (51) Int. Cl.
*C09K 8/03* (2006.01)
*C09K 8/32* (2006.01)
*C09K 8/36* (2006.01)
*E21B 21/00* (2006.01)

(56) References Cited

U.S. PATENT DOCUMENTS

| | | |
|---|---|---|
| 4,217,229 A | 8/1980 | Watson |
| 5,134,118 A | 7/1992 | Patel et al. |
| 5,519,214 A | 5/1996 | Houwen et al. |
| 6,378,628 B1 | 4/2002 | McGuire et al. |
| 7,569,523 B2 | 8/2009 | Cooke, Jr. |
| 7,696,131 B2 | 4/2010 | Oyler et al. |
| 7,950,472 B2 | 5/2011 | DiFoggio et al. |
| 7,971,643 B2 | 7/2011 | Brannon et al. |
| 8,128,827 B2 | 3/2012 | Gallo et al. |
| 8,309,497 B1 | 11/2012 | Zhang |
| 8,672,057 B2 | 3/2014 | DuPriest et al. |
| 8,812,236 B1 | 8/2014 | Freeman et al. |
| 2009/0188721 A1 | 7/2009 | Smith |
| 2011/0166047 A1* | 7/2011 | Patel ................... C09K 8/36 507/110 |
| 2011/0232910 A1 | 9/2011 | Daccord |
| 2013/0296199 A1 | 11/2013 | Ghassemzadeh |
| 2014/0166361 A1 | 6/2014 | Jamison et al. |
| 2014/0202772 A1 | 7/2014 | Kulkarni et al. |
| 2014/0357536 A1 | 12/2014 | Maghrabi et al. |

OTHER PUBLICATIONS

International Search Report and Written Opinion for PCT/US2015/033472 dated Dec. 14, 2015.

* cited by examiner

DRILLING FLUIDS WITH HIGH DISPERSED PHASE CONCENTRATION

BACKGROUND

The present application relates to mitigating sag in drilling fluids.

While drilling a gas or oil well, a drilling fluid (also referred to as a drilling mud) is typically pumped down to the drill bit during drilling operations and flowed back to the surface through the annulus defined between the drill string and the walls of the borehole. A typical drilling fluid includes a weighting material, such as barite, to increase the density of the drilling fluid and thereby manage the wellbore pressure and also assist in transporting rock chips and cuttings from the drill bit to the surface.

Settling or migration of the suspended weighting materials within the drilling fluid is commonly referred to as "sag" or "barite sag," and is a known and persistent problem in drilling operations. Turbulence in the moving fluid may tend to keep particles in suspension, but when the drilling fluid becomes static, such as while tripping the drill bit or when the circulation flow rate of the drilling fluid is relatively low or stopped, the weighting material(s) may tend to settle toward the bottom of the borehole.

When sag occurs in a borehole (also referred to as a sag event), it can cause borehole pressure problems that are typically manifested when the mud pumps are turned on after quiescent periods, or during operations such as tripping in when the fluids are periodically sheared and then circulation resumed. Problematic borehole pressure spikes may occur when the drilling fluid is pumped after a sag event. The lighter drilling fluid (depleted due to sag) nearer the surface is pumped out first, leaving the borehole filled with the heavier (solids accumulated portions), settled drilling fluid and the newly introduced drilling fluid that is being pumped down the drill string. As the borehole annulus is now filled with a heavier fluid, on average, and the heavier fluid may have a greater flow resistance than the original fluid and higher hydrostatic pressure because of a higher average density. The borehole pressures at some vertical depths can exceed the fracture gradient of the surrounding formation, resulting in lost circulation, formation damage and/or fracturing of the formation.

Sag is aggravated in deviated or angled boreholes due to a phenomenon called "boycott settling" or the "boycott effect." Briefly, the boycott effect occurs since suspended particles tend to settle vertically downward, creating an increased-density or heavier layer along the lower side of the angled borehole and a reduced-density or lighter layer along the upper side. Such a pressure imbalance across the longitudinal cross-section of the angled borehole will tend to circulate the lighter layer upward and the heavier layer downward, significantly increasing the rate at which the heavier particles accumulate in the lower portion of the angled borehole. Accumulations of the weighting material in the lower portion of the borehole can be difficult to re-suspend and may cause drag on rotating drill strings or impede moving tools up or down through the region of accumulated weighting material.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to mitigating sag in drilling fluids. More specifically, the embodiments described herein relate to increasing the dispersed phase concentration in drilling fluids to decrease sag. The dispersed phase of a drilling fluid is composed of the solids (e.g., weighting agents) and the emulsion droplets, for emulsified drilling fluids, dispersed in the continuous phase.

The drilling fluids described herein (1) have a density of about 5 pounds per gallon to about 25 pounds per gallon, (2) comprise a base fluid and a dispersed phase that includes at least one of: extremely low gravity solids (ELGS) having a specific gravity ($\rho_{ELGS}$) of $0.1 < \rho_{ELGS} \leq 1.0$, low gravity solids (LGS) having a specific gravity ($\rho_{LGS}$) of $1.0 < \rho_{LGS} \leq 2.7$, high gravity solids (HGS) having a specific gravity ($\rho_{HGS}$) of $2.7 < \rho_{HGS} \leq 8$, or emulsion droplets, and (3) satisfy Equation 1, Equation 2, or both:

$$\phi_{ELGS} + \phi_{LGS} + \phi_{HGS} = \phi_{solids} \geq 0.35 \qquad \text{Equation 1}$$

$$\phi_{ELGS} + \phi_{LGS} + \phi_{HGS} + \phi_{EMUL} = \phi_{dispersed} \geq 0.50 \qquad \text{Equation 2}$$

where:
$\phi_{ELGS}$ is a volume fraction of the extremely low gravity solids relative to the drilling fluid;
$\phi_{LGS}$ is a volume fraction of the low gravity solids relative to the drilling fluid;
$\phi_{HGS}$ is a volume fraction of the high gravity solids relative to the drilling fluid;
$\phi_{EMUL}$ is a volume fraction of the emulsion droplets relative to the drilling fluid;
$\phi_{solids}$ is a volume fraction of dispersed solids relative to the drilling fluid; and
$\phi_{dispersed}$ is a volume fraction of the dispersed phase relative to the drilling fluid.

An exemplary drilling fluid described herein may be an invert emulsion where the water internal phase (or water emulsion droplets) is 10% of the volume of the drilling fluid (i.e., 0.10 volume fraction of the drilling fluid) and include LGS at 0.30 volume fraction and HGS at 0.15 volume fraction. Accordingly, the exemplary drilling fluid satisfies both Equations 1 and 2.

Another exemplary drilling fluid described herein may be an emulsion where the oil internal phase (or oil emulsion droplets) is 0.30 volume fraction of the drilling fluid and include ELGS at 0.10 volume fraction, LGS at 0.10 volume fraction, and HGS at 0.10 volume fraction. Accordingly, this exemplary drilling fluid satisfies Equation 2.

Yet another exemplary drilling fluid described herein may be an oil based fluid with particulates dispersed therein that include ELGS at 0.10 volume fraction, LGS at 0.15 volume fraction, and HGS at 0.15 volume fraction. Accordingly, this exemplary drilling fluid satisfies Equation 1.

Examples of ELGS may include, but are not limited to, hollow spheres such those comprising glass, ceramic, polymer etc., olive stone, polyethylene, polypropylene, polystyrene, polycarbonates, graphites, natural rubbers, polyacrylonitriles, and the like, and any combination thereof. The volume fraction of ELGS in the drilling fluid may, in some instances, be from 0 to about 0.50.

Examples of LGS may include, but are not limited to, calcium carbonate, marble, limestone, salt (e.g., salt crystals), shale, bentonite, graphitic material, silica, kaolinite, sepiolite, hectorite, organoclays, insoluble polymeric material, calcite, aragonite, polystyrene, polycarbonates, natural rubber, nut hulls, and the like, and any combination thereof. The volume fraction of LGS in the drilling fluid may, in some instances, be from 0 to about 0.40.

Examples of HGS may include, but are not limited to, hematite, iron oxide, iron carbonate, galena, magnetite, barite, dolomite, manganese tetraoxide, ilmenite, siderite, celesite, dolomite, manganese carbonate, and the like, and any combination thereof. The volume fraction of HGS in the drilling fluid may, in some instances, be from about 0 to about 0.40.

Emulsions may be water-in-oil emulsions (i.e., water emulsion droplets dispersed in a continuous oil phase), which are sometimes referred to as invert emulsions, or oil-in-water emulsions (i.e., oil emulsion droplets dispersed in a continuous water phase). The volume fraction of emulsion droplets in the drilling fluid may, in some instances, be from about 0 to about 0.50.

The exemplary drilling fluids described herein may, because of the high $\phi_{solids}$ and/or high $\phi_{dispersed}$, may be thermally-stable against sag over a wider range of temperatures. For example, a static sag test at 250° F. for 48 hours may provide a change in density of certain bottom portion of the sample that is less than about 1 pounds per gallon (lbm/gal) (e.g., about 0.1 to about 1), or more preferably less than about 0.5 lbm/gal. In measuring static sag, a 350 mL sample of the drilling fluid is placed in a cylinder (i.e., the static aging cell that has a capacity of 500 ml, a length of 16 cm (~6.3 in), and an inner diameter of approximately 6.3 cm (~2.5 in)). The sample of the drilling fluid may be static aged in the static aging cell, dimensions. After static aging the density of the drilling fluid in the bottom 100 mL is compared to the initial density of the fluid as a measure of the solids that have settled or the sag of the fluid. As used herein, this method of measuring sag is referred to as a "bottom density change."

The exemplary drilling fluids described herein may, because of the high $\phi_{solids}$ and/or high $\phi_{dispersed}$, may have a thermally-stable rheology, which may allow for using the fluids in higher temperature formations. For example, the viscosity of a drilling fluid described herein as measured by a FANN-75 at 2000 psi may vary by less than about 30% (e.g., about 5% to about 30%), or more preferably less than about 20%, over a temperature range of about 120° F. to about 300° F. Accordingly, such drilling fluids may be useful in formations with a bottomhole circulating temperature up to about 500° F. (e.g., about 100° F. to about 500° F.), up to about 300° F., or up to about 250° F.

The drilling fluids described herein may be used in conjunction with wellbores of any deviation including, but not limited to, vertical wells, deviated wells, highly deviated wells, horizontal wells, and hybrid wells comprising sections of any combination of the aforementioned wells. In some embodiments, a subterranean formation and wellbore may be provided with an existing fracture network. As used herein, the term "deviated wellbore" refers to a wellbore in which any portion of the well is that is oriented between about 5-degrees and about 90-degrees from a vertical inclination. In some instances, sag may be of particular concern in deviated wellbores oriented between about 45-degrees and about 60-degrees from a vertical inclination. As described previously, sag may be more pronounced in deviated wellbores, so the drilling fluids described herein may be more preferably applied to wellbores where at least a portion of the wellbore is deviated, highly deviated, horizontal, or a combination thereof".

The exemplary drilling fluids disclosed herein may directly or indirectly affect one or more components or pieces of equipment associated with the preparation, delivery, recapture, recycling, reuse, and/or disposal of the drilling fluids. For example, and with reference to FIG. 1, the drilling fluids disclosed herein may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
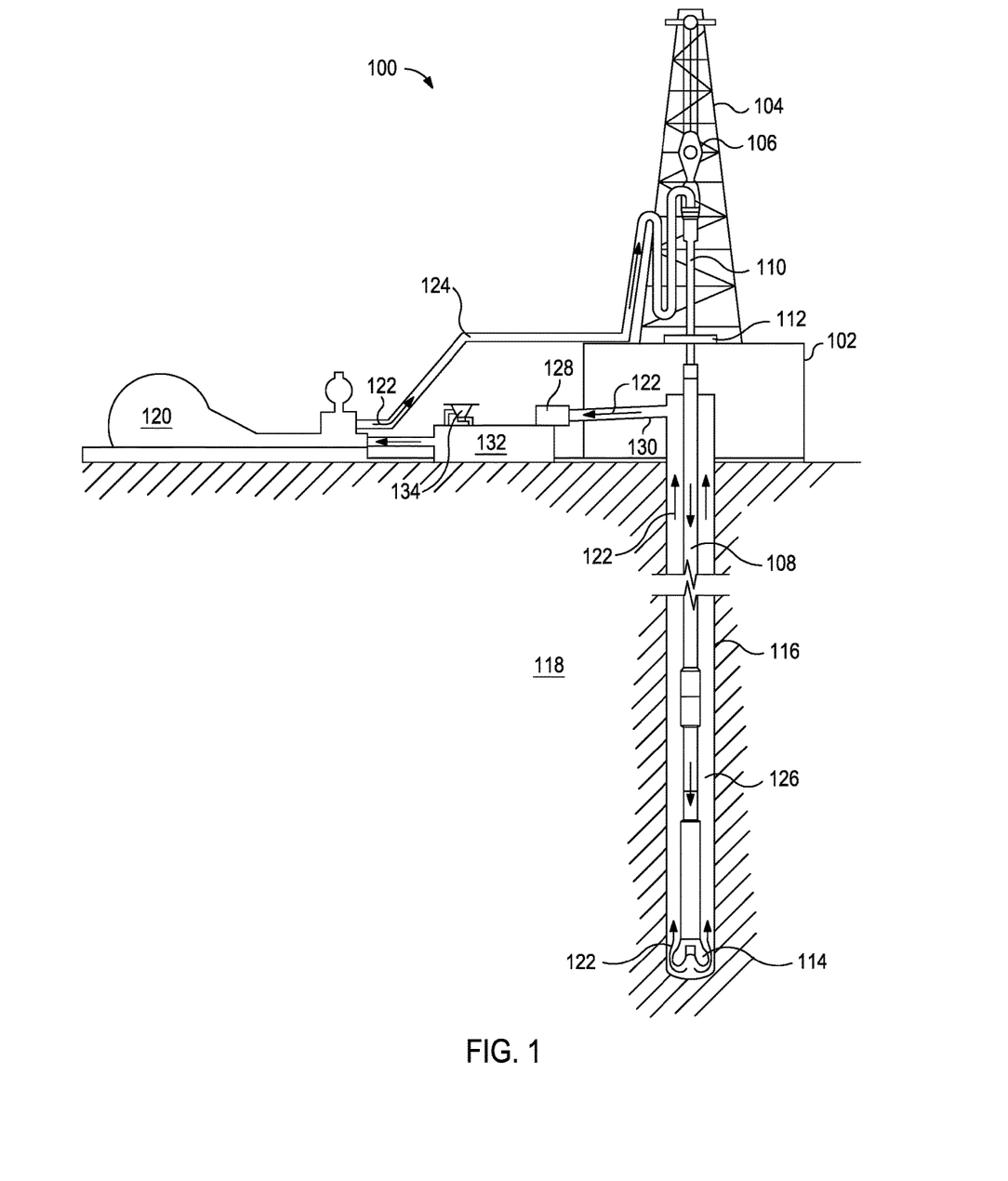
FIG. 1 illustrates a drilling assembly suitable for use in conjunction with the drilling fluids according to at least some embodiments described herein.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 prepared with the compositions disclosed herein through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the solid particles disclosed herein may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed solid particles may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed solid particles may be stored, reconditioned, and/or regulated until added to the drilling fluid 122.

As mentioned above, the drilling fluid 122 prepared with a composition disclosed herein may directly or indirectly affect the components and equipment of the drilling assembly 100. For example, the disclosed drilling fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 prepared as disclosed herein may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

The drilling fluid 122 prepared as disclosed herein may also directly or indirectly affect the various downhole equipment and tools that may come into contact with the drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluid 122 may also directly or indirectly affect any downhole heat exchangers, valves and corresponding actuation devices, tool seals, packers and other wellbore isolation devices or components, and the like associated with the wellbore 116. The disclosed drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling fluid 122 prepared as disclosed herein may also directly or indirectly affect any transport or delivery equipment used to convey the drilling fluid 122 to the drilling assembly 100 such as, for example, any transport vessels, conduits, pipelines, trucks, tubulars, and/or pipes used to fluidically move the drilling fluid 122 from one location to another, any pumps, compressors, or motors used to drive the drilling fluid 122 into motion, any valves or related joints used to regulate the pressure or flow rate of the drilling fluid 122, and any sensors (i.e., pressure and temperature), gauges, and/or combinations thereof, and the like.

Embodiments disclosed herein include:

A. a drilling fluid that (1) has a density of about 5 pounds per gallon to about 25 pounds per gallon, (2) comprises a base fluid and a dispersed phase that includes at least one of: extremely low gravity solids having a specific gravity ($\rho_{ELGS}$) of $0.1 < \rho_{ELGS} \leq 1.0$, low gravity solids having a specific gravity ($\rho_{LGS}$) of $1.0 < \rho_{LGS} \leq 2.7$, high gravity solids having a specific gravity ($\rho_{HGS}$) of $2.7 < \rho_{HGS} \leq 8$, or emulsion droplets, and (3) satisfies Equation 1, Equation 2, or both;

B. a method that includes drilling at least a portion of a wellbore penetrating a subterranean formation with the drilling fluid of Embodiment A; and C. a system that includes a drilling assembly with a drill string extending therefrom and into a wellbore in a subterranean formation with at least one depleted zone having a plurality of fractures extending from the wellbore into the at least one depleted zone; and a pump fluidly coupled to the drill string, the drill string containing a drilling fluid of Embodiment A.

Each of Embodiments A, B, and C may have one or more of the following additional elements in any combination: Element 1: wherein the drilling fluid has a bottom density change of less than about 1 lbm/gal after a static age at 250° F. for 48 hours; Element 2: wherein the drilling fluid has a bottom density change of less than about 0.5 lbm/gal after a static age at 250° F. for 48 hours; Element 3: wherein the drilling fluid includes at least one extremely low gravity solid selected from the group consisting of: hollow spheres, olive stone, polyethylene, polypropylene, polystyrene, polycarbonates, graphites, natural rubbers, polyacrylonitriles, and any combination thereof; Element 4: wherein the drilling fluid includes extremely low gravity solids at a concentration of about 0.05 to about 0.5; Element 5: wherein the drilling fluid includes at least one low gravity solid selected from the group consisting of: calcium carbonate, marble, limestone, salt, shale, bentonite, graphitic material, silica, kaolinite, sepiolite, hectorite, organoclays, insoluble polymeric material, calcite, aragonite, polystyrene, polycarbonates, natural rubber, nut hulls, and any combination thereof; Element 6: wherein the drilling fluid includes low gravity solids at a concentration of about 0 to about 0.4 (e.g., about 0.05 to about 0.4 or any subset therebetween); Element 7: wherein the drilling fluid includes at least one high gravity solid selected from the group consisting of: hematite, iron oxide, iron carbonate, galena, magnetite, barite, dolomite, manganese tetraoxide, ilmenite, siderite, celesite, dolomite, manganese carbonate, and any combination thereof; Element 8: wherein the drilling fluid includes high gravity solids at a concentration of about 0.05 to about 0.4; and Element 9: wherein the drilling fluid includes emulsion at a concentration of about 0.05 to about 0.5. Further, each of Embodiments B and C may have one or more of the following additional elements in any combination: Element 10: wherein the subterranean formation has a bottomhole circulating temperature of about 100° F. to about 500° F.; and Element 11: wherein the portion of the wellbore is deviated.

By way of non-limiting example, exemplary combinations applicable to Embodiments A, B, C include: Element 3 in combination with Element 4; Element 5 in combination with Element 6; Element 7 in combination with Element 8; two or more of Elements 3, 5, or 7 in combination optionally further in combination with at least one of Elements 4, 6, or 8; two or more of Elements 4, 6, or 8 in combination optionally further in combination with at least one of Elements 3, 5, or 7; at least one of Elements 1, 2, or 9 in combination with the foregoing; Element 1 or Element 2 in combination with one or more of Elements 3-9; and Element 9 in combination with one or more of Elements 1-8.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Seven drilling fluid samples were prepared according to the formulations in Table 1 and then hot rolled at 150° F. for 16 hours

TABLE 1

| Sample | Oil to Water Vol. Ratio | Density (lbm/gal) | HGS conc. (Barite) (lbm/bbl) | LGS conc. (CaCO₃) (lbm/bbl) | ELGS conc. (lbm/bbl) | $\phi_{solids}$ | $\phi_{disperse}$ |
|---|---|---|---|---|---|---|---|
| 1 | 80:20 | 14 | 347 | — | — | 25% | 40% |
| 2 | 80:20 | 14 | 204 | 170* | — | 33% | 46% |
| 3 | 80:20 | 14 | 148.3 | 235* | — | 36% | 49% |
| 4 | 80:20 | 14 | 148.3 | 235** | — | 36% | 49% |
| 5 | 80:20 | 14 | 351.8 | — | 10*** | 28% | 42% |
| 6 | 80:20 | 14 | 358.6 | — | 10**** | 30% | 43% |
| 7 | 80:20 | 14 | 369.8 | — | 20**** | 37% | 51% |

*CaCO₃ was BARACARB ® 25.
**CaCO₃ was BARACARB ® 50.
***Hollow glass beads, $\rho_{ELGS}$ = 0.6.
****Hollow glass beads, $\rho_{ELGS}$ = 0.42.

In measuring static sag, a 350 mL sample of the drilling fluid is placed in a cylinder i.e. the static aging cell that has a capacity of 500 ml, a length of 16 cm (~6.3 in), and an inner diameter of approximately 6.3 cm (~2.5 in) and 350 ml of the invert emulsion was static aged in the static aging cell, dimensions. The amount of oil separation was measured by using a syringe to extract and measure the separated oil. The density of the bottom 100 mL of aged sample was measured and compared to the original density as a measure of the amount of sag in each sample. Table 2 provides the results.

TABLE 2

| Sample | Oil Separation (mL) | Original Density (lbm/gal) | Aged Density in Bottom 100 mL (lbm/gal) | Δ Density (lbm/gal) |
|---|---|---|---|---|
| 1 | 50 | 14 | 15.9 | 1.9 |
| 2 | 13 | 14 | 15 | 1.0 |
| 3 | 4 | 14 | 14.4 | 0.4 |
| 4 | 8 | 14 | 14.2 | 0.2 |
| 5 | 50 | 14 | 15.6 | 1.6 |
| 6 | 60 | 14 | 15.4 | 1.4 |
| 7 | 10 | 14 | 14.8 | 0.8 |

Samples 3, 4, and 7 have significantly less oil separation and sag as compared to the control (Sample 1), which is due to the $\phi_{solids} \geq 0.35$.

Figure 2:
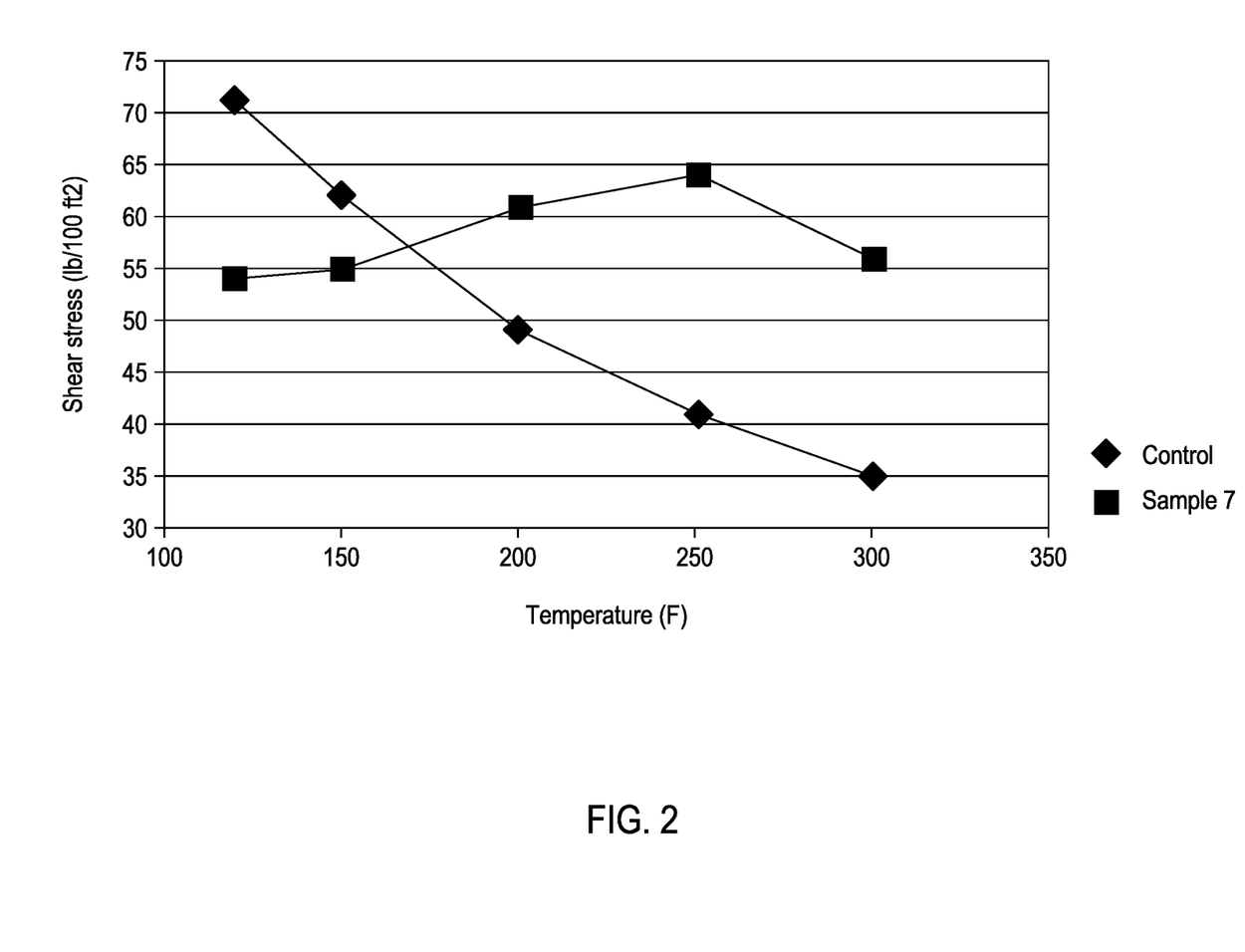
FIG. 2 provides the 300 rpm (Newtonian shear rate of about 511 s$^{-1}$) data collected over a temperature range of about 120° F. to about 300° F. at 2000 psi for a control sample and a drilling fluid according to at least one embodiment described herein.
Figure 3:
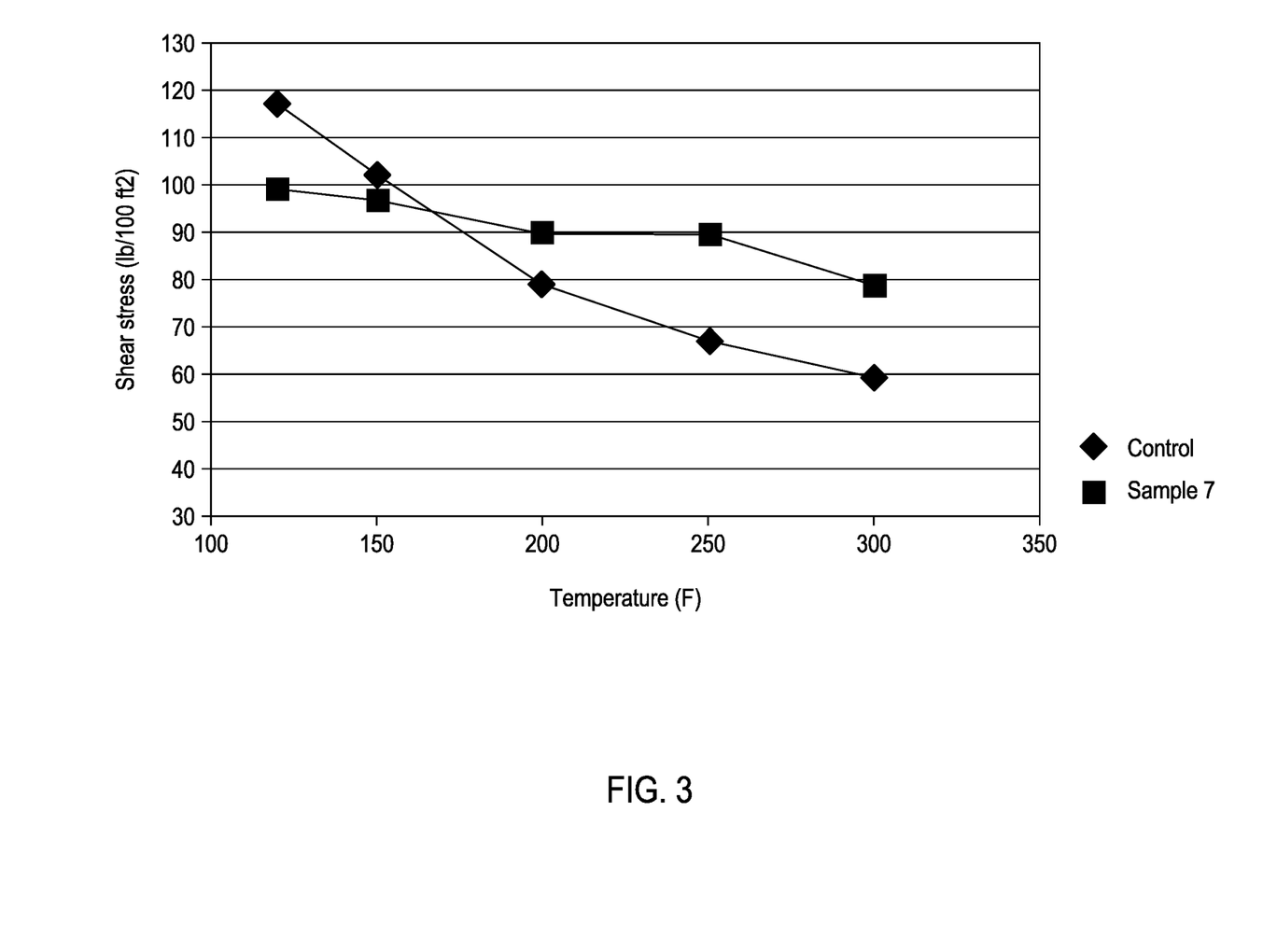
FIG. 3 provides the 600 rpm (Newtonian shear rate of about 1022 s$^{-1}$) data collected over a temperature range of about 120° F. to about 300° F. at 2000 psi for a control sample and a drilling fluid according to at least one embodiment described herein.

The rheological properties of Sample 7 were compared to a control sample having 31% solids, specifically barite (26%) and CaCO₃ (5%). The rheology of each sample was measured on a FANN-75 at 300 rpm (Newtonian shear rate of about 511 s⁻¹) and 600 rpm (Newtonian shear rate of about 1022 s⁻¹) under 2000 psi pressure. FIGS. 2 and 3 provide the 300 rpm and 600 rpm data, respectively, collected over a temperature range of about 120° F. to about 300° F. In both graphs, the control sample has a higher initial viscosity that quickly drops as the temperature increases. In contrast, Sample 7 maintains viscosity over the temperature ranges illustrated. This illustrates that the high solids drilling fluids described herein are temperature-stable, sag-resistant fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   drilling at least a portion of a wellbore penetrating a subterranean formation with a drilling fluid that (1) has a density of about 5 pounds per gallon to about 25 pounds per gallon, (2) comprises a base fluid and a dispersed phase that includes at least one of: extremely low gravity solids having a specific gravity ($\rho_{ELGS}$) of $0.1<\rho_{ELGS}\leq1.0$, low gravity solids having a specific gravity ($\rho_{LGS}$) of $1.0<\rho_{LGS}\leq2.7$, high gravity solids having a specific gravity ($\rho_{HGS}$) of $2.7<\rho_{HGS}\leq8$, or emulsion droplets, and (3) satisfies Equation 1, Equation 2, or both:

$$\phi_{ELGS}+\phi_{LGS}+\phi_{HGS}=\phi_{solids}\geq0.35 \quad \text{Equation 1}$$

$$\phi_{ELGS}+\phi_{LGS}+\phi_{HGS}+\phi_{EMUL}=\phi_{dispersed}\geq0.50 \quad \text{Equation 2}$$

where:
   $\phi_{ELGS}$ is a volume fraction of the extremely low gravity solids relative to the drilling fluid;
   $\phi_{LGS}$ is a volume fraction of the low gravity solids relative to the drilling fluid;
   $\phi_{HGS}$ is a volume fraction of the high gravity solids relative to the drilling fluid;
   $\phi_{EMUL}$ is a volume fraction of the emulsion droplets relative to the drilling fluid;
   $\phi_{solids}$ is a volume fraction of dispersed solids relative to the drilling fluid; and
   $\phi_{dispersed}$ is a volume fraction of the dispersed phase relative to the drilling fluid.

2. The method of claim 1, wherein the drilling fluid has a bottom density change of less than about 1 lbm/gal after a static age at 250° F. for 48 hours.

3. The method of claim 1, wherein the drilling fluid has a bottom density change of less than about 0.5 lbm/gal after a static age at 250° F. for 48 hours.

4. The method of claim 1, wherein the subterranean formation has a bottomhole circulating temperature of about 100° F. to about 500° F.

5. The method of claim 1, wherein the drilling fluid includes at least one extremely low gravity solid selected from the group consisting of: hollow spheres, olive stone, polyethylene, polypropylene, polystyrene, polycarbonates, graphites, natural rubbers, polyacrylonitriles, and any combination thereof.

6. The method of claim 1, wherein the drilling fluid includes extremely low gravity solids at a concentration of about 0.05 to about 0.5.

7. The method of claim 1, wherein the drilling fluid includes at least one low gravity solid selected from the group consisting of: calcium carbonate, marble, limestone, salt, shale, bentonite, graphitic material, silica, kaolinite, sepiolite, hectorite, organoclays, insoluble polymeric material, calcite, aragonite, polystyrene, polycarbonates, natural rubber, nut hulls, and any combination thereof.

8. The method of claim 1, wherein the drilling fluid includes low gravity solids at a concentration of about 0.05 to about 0.4.

9. The method of claim 1, wherein the drilling fluid includes at least one high gravity solid selected from the group consisting of: hematite, iron oxide, iron carbonate, galena, magnetite, barite, dolomite, manganese tetraoxide, ilmenite, siderite, celesite, dolomite, manganese carbonate, and any combination thereof.

10. The method of claim 1, wherein the drilling fluid includes high gravity solids at a concentration of about 0.05 to about 0.4.

11. The method of claim 1, wherein the drilling fluid includes emulsion at a concentration of about 0.05 to about 0.5.

12. A drilling fluid comprising:
   a base fluid and a dispersed phase that includes at least one of: extremely low gravity solids having a specific gravity ($\rho_{ELGS}$) of $0.1<\rho_{ELGS}\leq1.0$, low gravity solids having a specific gravity ($\rho_{LGS}$) of $1.0<\rho_{LGS}\leq2.7$, high gravity solids having a specific gravity ($\rho_{HGS}$) of $2.7<\rho_{HGS}\leq8$, or emulsion droplets;
   wherein the drilling fluid has a density of about 5 pounds per gallon to about 25 pounds per gallon and satisfies Equation 1, Equation 2, or both $$\phi_{ELGS}+\phi_{LGS}+\phi_{HGS}=\phi_{solids}\geq0.35 \quad \text{Equation 1}$$

$$\phi_{ELGS}+\phi_{LGS}+\phi_{HGS}+\phi_{EMUL}=\phi_{dispersed}\geq0.50 \quad \text{Equation 2}$$

where:
   $\phi_{ELGS}$ is a volume fraction of the extremely low gravity solids relative to the drilling fluid;
   $\phi_{LGS}$ is a volume fraction of the low gravity solids relative to the drilling fluid;
   $\phi_{HGS}$ is a volume fraction of the high gravity solids relative to the drilling fluid;
   $\phi_{EMUL}$ is a volume fraction of the emulsion droplets relative to the drilling fluid;
   $\phi_{solids}$ is a volume fraction of dispersed solids relative to the drilling fluid; and
   $\phi_{dispersed}$ is a volume fraction of the dispersed phase relative to the drilling fluid.

13. The drilling fluid of claim 12, wherein the drilling fluid has a bottom density change of less than about 1 lbm/gal after a static age at 250° F. for 48 hours.

14. The drilling fluid of claim 12, wherein the drilling fluid has a bottom density change of less than about 0.5 lbm/gal after a static age at 250° F. for 48 hours.

15. The drilling fluid of claim 12, wherein the drilling fluid includes extremely low gravity solids at a concentration of about 0.05 to about 0.5.

16. The drilling fluid of claim 12, wherein the drilling fluid includes low gravity solids at a concentration of about 0.05 to about 0.4.

17. The drilling fluid of claim 12, wherein the drilling fluid includes high gravity solids at a concentration of about 0.05 to about 0.4.

18. The drilling fluid of claim 12, wherein the drilling fluid includes emulsion at a concentration of about 0.05 to about 0.5.

19. A system comprising:
   a drilling assembly with a drill string extending therefrom and into a wellbore in a subterranean formation with at least one depleted zone having a plurality of fractures extending from the wellbore into the at least one depleted zone; and
   a pump fluidly coupled to the drill string, the drill string containing a drilling fluid comprising a base fluid and a plurality of particulates; wherein the plurality of particulates includes at least one of: extremely low gravity solids having a specific gravity ($\rho_{ELGS}$) of $0.1<\rho_{ELGS}\leq1.0$, low gravity solids having a specific gravity ($\rho_{LGS}$) of $1.0<\rho_{LGS}\leq2.7$, high gravity solids having a specific gravity ($\rho_{HGS}$) of $2.7<\rho_{HGS}\leq8$, or emulsion droplets; and wherein the drilling fluid has a density of about 5 pounds per gallon to about 25 pounds per gallon and satisfies Equation 1, Equation 2, or both $$\phi_{ELGS}+\phi_{LGS}+\phi_{HGS}=\phi_{solids} \geq 0.35 \qquad \text{Equation 1}$$

$$\phi_{ELGS}+\phi_{LGS}+\phi_{HGS}+\phi_{EMUL}=\phi_{dispersed} \geq 0.50 \qquad \text{Equation 2}$$

where:
- $\phi_{ELGS}$ is a volume fraction of the extremely low gravity solids relative to the drilling fluid;
- $\phi_{LGS}$ is a volume fraction of the low gravity solids relative to the drilling fluid;
- $\phi_{HGS}$ is a volume fraction of the high gravity solids relative to the drilling fluid;
- $\phi_{EMUL}$ is a volume fraction of the emulsion droplets relative to the drilling fluid;
- $\phi_{solids}$ is a volume fraction of dispersed solids relative to the drilling fluid; and
- $\phi_{dispersed}$ is a volume fraction of the dispersed phase relative to the drilling fluid.

20. The system of claim 19, wherein the portion of the wellbore is deviated.

\* \* \* \* \*